United States Patent Office 3,205,205
Patented Sept. 7, 1965

3,205,205
COPOLYMERIZATION OF OLEFINS WITH A
$VOCl_3$-$AlR_3$-$I_2$ CATALYST
Harold E. Adams, Cuyahoga Falls, Ohio, assignor to The
Firestone Tire & Rubber Company, Akron, Ohio, a
corporation of Ohio
No Drawing. Filed Dec. 12, 1960, Ser. No. 75,108
8 Claims. (Cl. 260—88.2)

This invention relates to the copolymerization of lower monoolefins to form products which, when vulcanized, have excellent elastometric properties, particularly recovery after elastic deformation.

Copolymers of ethylene, propylene and the like lower olefins have heretofore been prepared which, when subjected to cross-linking influences, form vulcanizates having more or less rubbery properties. These vulcanizates fall far short of ideal elastomeric properties, particularly in their retention of deformation after stress. It is recognized that this is probably due to two factors. The first of these is "block copolymer" configuration, i.e., a non-statistical distribution of the different monomer units along the copolymer chain, in which long runs of one monomer unit are followed by considerable runs of another monomer unit, rather than a statistical interspersion of the two monomers. This is undesirable because the local blocks of copolymers take part in local formation of crystalline areas, and also because usually the units derived from one of the monomers are more active in the final cross-linking reaction than the other units, so that an inefficient cross-linking pattern is established. The other factor leading to poor properties in the vulcanizates is the degree of crystallizing tendency of the blocks of monomers; to the extent that blocks occur, it is desirable that they should be in an atactic or other non-crystallizing configuration. Various proposals have been made to provide polymerization processes and catalysts which will yield copolymers with a minimum of the defects above noted. Up to the present time, however, no great success has been achieved in this area of investigation.

Accordingly it is an object of this invention to provide improved rubbery copolymers of the lower monoolefins which will yield vulcanizates having excellent elastomeric properties.

Another object is to provide a process for producing such polymers having greatly improved recovery from stress-induced deformations.

A further object is to provide a process for producing such polymers which are substantially free from block copolymerization configurations.

THE INVENTION

The above and other objects are secured, in accordance with this invention, in a process in which two or more lower alpha-monoolefins containing from two to six carbon atoms are copolymerized in the presence of a catalyst prepared by mixing together (A) a vanadium oxytrihalide which has been modified with benezene or other modifying agents discussed more fully hereinbelow plus (B) a reaction product of a trihydrocarbon aluminum or dihydrocarbon aluminum hydride in which each hydrocarbon group contains from 2 to 10 carbon atoms with 0.25 to 4.0 gram-atoms of elemental iodine per mol of the aluminum compound. In those cases where any of the hydrocarbon groups of the aluminum compound contains less than 5 carbon atoms, a small amount of an alkyl lithium compound must be added to the aluminum compound before reacting it with iodine. The process is carried out by supplying a mixture of the olefins to be copolymerized to a reaction zone containing the catalyst at temperatures in the range $-80°$ C. to $150°$, preferably $0°$ C. to $100°$ C. Polymerization takes place rapidly, and results in products which are free from homopolymers of the individual monomers and which are also free from block copolymer structures. The products may be vulcanized by means of peroxides or other free radical generators or, if a certain amount of unsaturation has been introduced, for instance by copolymerizing a small amount of acetylene or a diolefin, by means of sulfur, sulfur-accelerator and like systems used with natural and synthetic diolefin rubbers, to yield vulcanizates having high elasticity, strength and recovery from elastic deformation.

THE MONOOLEFINS

These may be any alpha-monoolefins, i.e., olefins having a —$CH=CH_2$ group containing from 2 to 6 carbon atoms. The copolymers should not contain more than about 85% of any given single monomer copolymerized therein. Suitable monoolefins will be seen to include ethylene, propylene, butene-1, pentene-1, hexene-1 and 3,3-dimethyl propene-1. Preferred copolymers are those containing 50% or more ethylene, and 15 to 50% of propylene, optionally along with others of the monoolefins indicated as suitable. Up to about 10 mol percent of acetylene or of a conjugated diolefin containing from 4 to 8 carbon atoms such as butadiene, isoprene, piperylene or the like may also be copolymerized in order to introduce unsaturated groups for vulcanization. All of the above percentages are on the basis of the total mols of all monomers polymerized in the copolymers.

THE VANADIUM OXYTRIHALIDES

These may be any of the vanadium oxytrihalides such as (the preferred) vanadium oxytrichloride, vanadium oxytrifluoride, vanadium oxytribromide or oxytriiodide. These compounds must always be contacted with benzene or reacted with other modifying agents to be noted below, at some time before they have been in contact with the aluminum compound-iodine reaction product for any substantial time. The vanadium oxytrihalide may first be mixed with the necessary benzene or other modifying agent, and then mixed with the aluminum compound-iodine reaction product and used as a polymerization catalyst in any suitable inert solvent. The mixing with the aluminum compound-iodine reaction product may be, and preferably is, done in the presence of the monomers to be polymerized. Alternatively, good results can be obtained when the vanadium oxytrihalide is combined with the aluminum compound-iodine reaction product in benzene solution, which may or may not contain the monomers to be polymerized; the benzene has an opportunity to complex with the vanadium oxytrihalide before it reacts with aluminum compound-iodine reaction product. The advantage of preliminarily modifying the vanadium oxytrihalide with the benzene or other modifying agent will be very evident, since it avoids the necessity of using large quantities of benzene, an expensive and rather toxic solvent, in the main polymerization reaction.

Modifying agents other than benzene which have been found suitable in the practice of the invention include for instance other aromatic hydrocarbons such as naphthalene, toluene, anthracene, chrysene, phenanthrene and the like; phenols, such as unsubstituted phenol itself, o-, p- and m-cresol, naphthol, and the like; and aromatic aldehydes such as benzaldehyde or naphthaldehyde. It will be understood that at least one mol of the benzene or other modifying agent will be provided for each mol of vanadium oxytrihalide.

THE REACTION PRODUCT OF THE ALUMINUM COMPOUND WITH IODINE

These may be the reaction products of elemental iodine with any compounds of the formula (1) 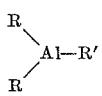

wherein R, independently in each occurrence, may be any hydrocarbon radical containing up to 12 carbon atoms and R' may be hydrogen or a hydrocarbon radical containing up to 12 carbon atoms.

A proviso must be made in the case of aluminum compounds in which either of the radicals R contains less than five carbon atoms, that a small amount of an alkyl lithium in which the alkyl group contains 1–10 carbon atoms (about 1–6 mols, preferably 1.5–3.0 mols per 100 mols of aluminum compound) must be added to those compounds before their reaction with the iodine. The reason for this is unknown; it is surmised that some sort of scavenging of impurities may take place. The proviso is unnecessary in the case of aluminum compounds (1) in which the hydrocarbon groups each contain 5 or more carbon atoms such as trihexyl aluminum, which is the compound by far the most preferred for use in this invention, since the polymers from catalysts derived from this compound produce the strongest vulcanizates and those which show the best recovery properties, of all of the products obtainable in accordance with the invention. The reaction products are made by adding the iodine slowly to a solution of the aluminum compound (1) in a hydrocarbon solvent such as recommended hereinbelow for the main polymerization reaction, using from 0.5 to 4.0 gram-atoms of iodine per mol of aluminum compound (1). The addition may, of course, be made in the reverse order. Examples of aluminum compounds coming under Formula 1 above and suitable for use in this invention include for instance trimethyl aluminum, triethyl aluminum, diethyl aluminum hydride, tripropyl aluminum, triisopropyl aluminum, tributyl aluminum, trihexyl aluminum, dihexyl aluminum hydride, trioctyl aluminum, tri(decyl) aluminum, tri(dodecyl) aluminum, and the like.

THE PREPARATION OF THE CATALYSTS AND THE POLYMERIZATION OPERATION

The catalyst is prepared by mixing together, in a suitable hydrocarbon solvent, the vanadium oxytrihalide (previously modified with benzene or one of the other modifying agents noted above if the solvent in which the catalyst is being prepared is not benzene) and the reaction product of the aluminum compound and iodine. The monomers to be polymerized may be, and preferably are, present, as for instance when the catalyst is prepared in situ in the final reaction vessel. Alternatively, however, the catalyst may be prepared separately in a hydrocarbon solvent and introduced as a solution in that solvent into the final reactor. The ratio of the gram-atoms of aluminum contained in the reaction product of the aluminum compound (1) and iodine to gram-atoms of vanadium in the vanadium compound used will be between 1:1 to 20:1, preferably 1:1 to 6:1. For small-scale preparations, the polymerization may be carried out in small crown-capped beverage bottles provided with perforated crown caps for the hypodermic injection of reactants. The solvent and aluminum compound-iodine reaction product are charged and the bottle sealed with the perforated cap. As to the charging of the monomers, it will be appreciated that the ratio of the concentrations of the monomers will usually not be the same as the ratio of the monomer units as copolymerized in the final product. Accordingly, the concentrations of the several monomers in the reaction will be selected in advance of the experiment, either by calculation by way of the well-known copolymerization equation, or empirically on the basis of experience, in such proportions as to yield initial polymers of the desired composition. For the monomer pair ethylene/propylene, the reactivity ratios are roughly for ethylene $r=14$ and for propylene $r=0.5$. The partial pressures of the particular monomers required to dissolve the individual monomers are known. Accordingly, the bottle is next charged with the monomers by injecting the first monomer through the cap by means of a hypodermic needle (with agitation of the bottle to insure equilibrium) until the back pressure (absolute value) rises to the partial pressure indicated for that monomer. Thereafter the second monomer is injected hypodermically, until the *increase* in back pressure reaches the value for the *partial* pressure required for the second monomer; and so on, for each additional monomer to be charged. On a large scale, the reaction will usually be carried out in a closed autoclave provided with a rotary agitator. Conveniently, agitation is commenced and the solvent and monomers are charged into the reactor, followed by a solution of the catalyst components. As the reaction proceeds, the monomers will be consumed, and it will be desirable to add further quantities of monomer so as to make full use of the catalyst and reactor capabilities over the run. It will be noted that the ratio of monomers in the initial charge may be, in fact usually is, not the same as in the polymer product desired; the monomers differ in the rapidity with which they enter the copolymer. Accordingly the monomers will be charged initially in a ratio which is found empirically to yield a copolymer of the desired composition. Thus if a copolymer of 65 mol percent ethylene and 35 mol percent propylene is desired it has been found that the initial charge should contain 10 mol percent ethylene and 90 mol percent propylene. After the polymerization is under way, the monomers will of course be fed in the ratio in which they are consumed in the reaction, i.e., the ratio in which it is intended that they shall occur in the final polymer. The operation will be continued until the reactor can hold no more product, or until the catalyst is exhausted; usually the catalyst and solvent are charged in such proportions that these events occur simultaneously. The catalyst will usually be capable of producing 60 or more times its own weight (calculated as the sum of the aluminum compound-iodine reaction product plus vanadium oxytrihalide) of polymer. The solvent will generally be capable of carrying 15% of polymer based on the weight of solvent, before the reaction mass becomes difficult to manage.

Referring to the solvents to be used in the polymerization reaction, these may be any hydrocarbon solvents free from ethylenic unsaturation and containing up to 40 carbon atoms such as paraffins on the order of propane, butane, hexane, cyclohexane, octane, decane, petroleum ether, kerosene, diesel oil, Fischer-Tropsch hydrocarbons and the like, or aromatic hydrocarbons such as benzene, toluene, the xylenes, and the like. As noted above, if the vanadium oxytrihalide has not previously been complexed with benzene or some other of the modifying agents discussed above, and if the catalyst is prepared in situ in the final reaction solvent, that solvent must be an aromatic hydrocarbon. However, aromatic hydrocarbons are expensive and somewhat toxic solvents, and it is preferred to prepare the catalyst by one of the procedures in which the vanadium oxytrihalide is contacted in advance with benzene or one of the other modifying agents discussed above before introduction into the reaction vessel, or at least under such conditions that the first contact of the catalyst components with each other is in an aromatic solvent. Under these procedures it is possible to use the cheaper and less toxic hydrocarbon solvents in the actual large-scale polymerization reaction.

THE COPOLYMER PRODUCTS

The copolymers produced in accordance with this invention, in contrast with copolymers prepared with the same gross monomeric compositions in accordance with earlier procedures, are characterized by freedom from homopolymers of the individual monomers, and also by substantial or complete freedom from block copolymer structures. These purely chemical features can be observed by infra-red analysis of the products. To the extent that there may be some small amounts of block structure present, this appears to be of the innocuous, non-crystalline, atactic variety. These desirable chemical properties are reflected in the physical properties of the vulcanizates made from the copolymers by cross-linking them with peroxides, or with peroxides plus sulfur, or grafting and cross-linking monomers such as maleic acid and methacrylic acid. The vulcanizates have excellent elongation and tensile strength, indicative of efficient cross-linking resulting from a statistical distribution of the cross-link-susceptible monomer units along the copolymer chains; and excellent resilience recovery from stress-induced deformation, indicating both efficient cross-linking and the absence of block copolymer structures and of crystallinity. The vulcanized products may be used in pneumatic tires, particularly in the tread and sidewall portions thereof, gaskets, tire-molding airbags, weather seals, control-lever boots, belting, vibration-isolating pads, and the like.

With the foregoing general discussion in mind, there are given herewith detailed examples of the practice of this invention.

*Example I.—Polymerization*

A

| | |
|---|---|
| Benzene (thiophene-free) | 30 gallons. |
| Ethylene (initial charge) | 0.9 pound (0.032 pound mol). |
| Propylene (initial charge) | 12.0 pounds (0.286 pound mol). |

B

| | |
|---|---|
| Triethyl aluminum solution (1.25 molar, in heptane) | 200 ml. |

C

| | |
|---|---|
| Trihexyl aluminum solution (.88 molar, in heptane) | 450 ml. |
| Iodine | 100 grams (0.788 gram-atom). |

D

| | |
|---|---|
| Vanadium oxytrichloride | 10 ml. (0.11 mol). |
| Heptane | 300 ml. |

E

| | |
|---|---|
| Trihexyl aluminum solution (2nd addition) (.88 molar in heptane) | 625 ml. |
| Iodine | 138 grams (1.09 gram-atoms). |

F

| | |
|---|---|
| Vanadium oxytrichloride (2nd addition) | 20 ml. (0.22 mol). |
| Heptane | 300 ml. |

A 50-gallon stainless steel autoclave provided with a rotary agitator, a small lock for introduction of reactants, a heating and cooling jacket and two leads with individual flow meters for sparging gases into the bottom of the autoclave, was used in this run. The autoclave was purged with nitrogen, and the benzene charged through a dehydrated alumina column. Thereafter the ethylene and propylene were pressured in from individual tanks, the amount of the charge being determined by observing the loss in weight of the tanks. The temperature was adjusted to 80° C., and kept at this value throughout the run to follow. Agitation was then commenced, and a small sample taken and titrated with triethyl aluminum with a titanium tetrachloride indicator to an end-point indicated by a dark discoloration, in order to determine the amount of triethyl aluminum required to destroy the oxygen, water etc. impurities in the autoclave. The indicated amount of triethyl aluminum B was then added to the autoclave through the lock. Next a solution was made up from the trihexyl aluminum solution and iodine at 25° C. the iodine being slowly added to the aluminum trihexyl solution. During the addition a white precipitate formed but redissolved. The resultant solution was then introduced through the lock into the autoclave and agitated with the contents therein for 45 minues, after which a solution made up from the vanadium oxytrichloride and heptane D was charged through the lock. Tanks of ethylene and propylene were then connected through the flowmeters to the spargers, and the individual flows thereof were manually controlled to provide 65 volumes of propylene and 35 volumes of ethylene as judged from the flowmeters, the total flow of both gases being controlled to keep the pressure in the autoclave at about 5 p.s.i.g. The polymerization seemed to be progressing rather slowly, and at the end of 27 minutes after the addition of the solution D, solutions of the constituents E and F were added separately in that order through the lock. The polymerization thereafter progressed more rapidly. Following is a log of the cumulative consumption of the several monomers as indicated by the flowmeters.

| Time [1] (min.) | Cumulative consumption of monomers [1] | | (lbs.) |
|---|---|---|---|
| | Ethylene | Propylene | Both |
| 27 | 0.31 | 0.24 | 0.55 |
| 48 | 0.65 | 0.52 | 1.17 |
| 81 | 1.29 | 0.99 | 2.28 |
| 151 | 2.86 | 2.25 | 5.11 |
| 226 | 4.06 | 3.20 | 7.26 |
| 280 | 4.69 | 3.70 | 8.39 |
| 356 | 5.19 | 4.10 | 9.29 |
| 403 | 5.42 | 4.28 | 9.70 |
| 611 | 6.17 | 4.81 | 10.98 |

[1] Taken from the time of addition of $VOCl_3$ solution D.

At the end of the run, the unreacted monomers were vented and the solution of polymer in the autoclave dropped and stirred into a vesssel containing isopropanol to precipitate the polymer. The resultant coagulum was transferred to a fresh bath of isopropanol containing 1% of alpha-naphthyl thiourea, and soaked for 18 hours. The polymer was then removed and dried in a vacuum oven at 120° F. There were obtained 9.0 pounds of a transparent rubbery polymer having good snap, banding well on the roll mill and exhibiting no substantial runs of either ethylene- or propylene-derived units on infra-red examination. The infra-red analysis indicated that the copolymer contained 20.3% of ethylene and 79.4% of propylene (on the basis of weight) copolymerized therein. The polymer had a Mooney viscosity ML/4/212° F. of 63.5, 7.0% gel, and an inherent viscosity of 1.87.

*Vulcanization*

G.

| | |
|---|---|
| Ethylene-propylene copolymer (prepared as just described) | 100 |
| HAF carbon black | 60 |
| Paraffin oil ("Necton 60" a low pour point oil manufactured by Esso Standard Oil Co.) | |
| Dicumyl peroxide mixture (40% dicumyl peroxide, 60% inert carrier by weight) | 12.5 |
| Sulfur | 1.0 |

A stock was made up from the foregoing ingredients, and specimens cured at 310° F. for 20, 40, 50 and 60 minutes. Following are the properties obtained.

TABLE II

Tensile strength (p.s.i.), cured for:
- 20 min. — 2375
- 40 min. — 2675
- 60 min. — 2575

200% Modulus (p.s.i.), cured for
- 20 min. — 300
- 40 min. — 425
- 60 min. — 500

300% Modulus (p.s.i.), cured for:
- 20 min. — 550
- 40 min. — 900
- 60 min. — 1000

Elongation at break (percent), cured for:
- 20 min. — 740
- 40 min. — 620
- 60 min. — 560

Percent break set 10 min. rest — 15
Brittle point (ASTM), cured 40 min., °C. — −100
Young's modulus index, cured 40 min., °C. — −48
Steel ball rebound, cured 50 min.
- at 73° F. — 48
- at 212° F. — 57

*Example II.—Polymerization*

A

Benzene (thiophene free) — 35 gallons.
Ethylene (initial charge) — 11.50 lbs.
Propylene (initial charge) — 0.80 lb.

B

Triethyl aluminum solution (1.5 molar, in hexane) — 100 ml.
Trihexyl aluminum solution (0.87 molar, in hexane) — 600 ml. (0.522 mol.).

C

Iodine — 127 g. (1.0 gram-atom).
Vanadium oxytrichloride — 10 ml. (0.11 mol).

D

Hexane — 1100 ml.

A 50-gallon stainless steel autoclave provided with a rotary agitator was used in this run. In order to feed monomers into the autoclave during the run, there were provided two pressure tanks provided with weighing scales which could be connected selectively to a sparger at the bottom of the autoclave. These were used alternatively; the first would be connected to sparger and would feed monomers to the autoclave while the second was pressured with ethylene and with propylene in the proportions (60% ethylene, 40% propylene by weight) in which it was desired that these monomers should be fed at the autoclave and to appear in the final polymer. When the first tank was exhausted, the roles of the two tanks were reversed, and so on.

At the beginning of the run, the autoclave was carefully cleaned, and the benzene of the recipe charged, adding 5 gallons excess over the recipe. The autoclave was then closed, stirring commenced, and the contents heated to 180° F., at which time the excess benzene was boiled off to purge impurities. Thereafter the ethylene and propylene of the recipe was pressured in. A sample of the contents was titrated with triethyl aluminum as in the preceding example, and the indicated quantity of triethyl aluminum B added through the lock. Thereafter the iodine was dissolved in the trihexyl aluminum solution, and the solution added through the lock, and the contents of the autoclave agitated for 18 hours.

In the meantime, two bottles of solution were made up from the ingredients D, divided equally between the two bottles. In each case, 550 ml. of the hexane were placed in the bottle, 50 ml. were boiled off, the vanadium oxytrichloride added, and the bottle capped.

At the end of the 18 hours' agitation the temperature of the autoclave contents was adjusted to 125° F., being kept at this temperature throughout the reaction to follow. The solution of ingredients D was added through the lock, whereupon polymerization set in immediately. The mixture of ethylene and propylene was bled into the autoclave from one or the other of the weigh-tanks throughout the run at a rate such as to keep the pressure in the autoclave at 25 p.s.i.g. Samples of the vapors in the free space of the autoclave and of the liquid were taken from time to time. The propylene contents, based on the weight of propylene and ethylene, of the gas sample, and the weight percent of polymer in the liquid samples, were determined. At the end of 25 hours, the excess monomers were vented, and the polymer solution stirred into a bath of isopropanol containing 1% of alpha-naphthyl thiourea to coagulate the polymer. The polymer was dried in a vacuum oven at 125° F for 24 hours. There were obtained 26.5 pounds of a clear rubbery polymer having good snap and banding well on the roll mill. Following is a log of the run.

TABLE III

| Time,[1] (min.) | Cumulative[1] wt. of monomers fed (lbs.) | Propylene in vapors (percent)[2] | Percent solids in liquid |
|---|---|---|---|
| 2 | 0.76 | | |
| 16 | 3.63 | | |
| 45 | 7.23 | 71.0 | 3.9 |
| 340 | 15.50 | | 8.4 |
| 446 | 18.81 | | |
| 1,510 | 26.8 | | 12.2 |

[1] After addition of VOCl₃ solution.
[2] As mol percent of ethylene plus propylene.

*Vulcanization*

|  | G. |
|---|---|
| Ethylene-propylene copolymer (prepared as just described) | 100 |
| HAF carbon black | 50 |
| Paraffin oil ("Necton 60" a low pour point oil manufactured by Esso Standard Oil Co.) | 10 |
| Dicumyl peroxide mixture (40% dicumyl peroxide, 60% inert carrier by weight) | 11 |
| Sulfur | 1 |

A stock was made up from the foregoing materials and specimens cured at 310° F. for 20, 40 and 60 minutes. Following are the properties obtained.

TABLE IV

Tensile strength (p.s.i.), cured for:
- 20 min. — 3400
- 40 min. — 3275
- 60 min. — 3375

300% modulus (p.s.i.), cured for:
- 20 min. — 825
- 40 min. — 1225
- 60 min. — 1300

Ultimate elongation (percent), cured for:
- 20 min. — 670
- 40 min. — 540
- 60 min. — 530

Percent break set — 17

*Example III*

A

Hexane — 30 gallons.
Ethylene — 0.5 lb.
Propylene — 6.8 lbs.

B

Aluminum triethyl solution (1.5 molar, in hexane) — 43 ml.

C

Aluminum trihexyl (0.87 molar, in heptane) — 600 ml. (0.522 mol).
Iodine — 127 grams (1.0 gram-atom).

D

Benzene (thiophene-free) _____ 1100 ml.
Vanadium oxytrichloride _____ 10 ml. (0.11 mol).

The procedure of Example II was repeated with the above reactants, the hexane at A of this example replacing the benzene at A of Example II, the benzene at C replacing the hexane at D of Example II, and the 43 ml. aluminum triethyl at B replacing that of Example II. A deep red coloration occurred when the ingredients at D were mixed, indicating the formation of a modified complex of some sort. Following is a log of the run.

TABLE V

| Time [1] (min.) | Cumulative [1] monomers added (lbs.) | Propylene in vapors [2] (percent) | Solids in Solution (percent) |
|---|---|---|---|
| 4 | 0.92 | | |
| 18 | 2.47 | | |
| 45 | 6.34 | | |
| 65 | 7.35 | 63.7 | 3.73 |
| 240 | 11.60 | 55.1 | 6.0 |
| 343 | 13.78 | | |
| 1,265 | 29.6 | | |

[1] After the addition of the VOCl₃ solution.
[2] Based on the mols of ethylene and propylene.

There were obtained 24.5 pounds of a snappy, transparent, rubbery copolymer which banded well on the mill. Infra-red analysis showed no crystalline bands, and indicated that the polymer contained 55.0% of ethylene and 45.0% of propylene, based on the weight of the copolymer, copolymerized therein.

*Vulcanization*

G.

Ethylene-propylene copolymer (prepared as just described) _____ 100
HAF carbon black _____ 50
Paraffin oil ("Necton 60," a low pour point oil manufactured by Esso Standard Oil Co.) _____ 10
Dicumyl peroxide mixture (40% dicumyl peroxide, 60% inert carried by weight) _____ 11
Sulfur _____ 1

A stock was made up from the foregoing ingredients, and specimens cured at 310° F. for 20, 40 and 60 minutes. Following are the properties obtained.

TABLE VI

Tensile strength (p.s.i.), cured for:
  20 min. _____ 3050
  40 min. _____ 3500
  60 min. _____ 3150
300% modulus (p.s.i.), cured for:
  20 min. _____ 675
  40 min. _____ 1000
  60 min. _____ 1025
Ultimate elongation (percent), cured for:
  20 min. _____ 660
  40 min. _____ 570
  60 min. _____ 540
Break set (percent) _____ 14

*Example IV.—Use of alkali metal alkyl with lower alkyl aluminum*

A. *Preparation of aluminum alkyl-iodine reaction product*

Triisobutyl aluminum solution (1 molar, in hexane)_ 25 ml. (0.025 mol).
Lithium butyl solution (1.5 molar, in hexane) _____ .05 ml. (0.00075 mol).
Iodine _____ 7.5 g. (0.059 gram-atom).

The triisobutyl aluminum and lithium butyl solutions were mixed together first, and the iodine stirred in thereafter. The preparation was then bottled for use in the polymerization step to follow.

B. *Polymerization*

Benzene _____ 500 ml.
Triisobutyl aluminum-iodine solution (prepared as just described) _____ 4 ml. (.004 mol Al(i-Bu)₃, .009 gram-atom I).
Vanadium oxytrichloride solution (0.1 molar, in hexane) _____ 5 ml. (.0005 mol).
Ethylene and propylene ___ By pressure.

The benzene was charged into a 28-ounce beverage bottle, which was then heated to boil off a small portion of the benzene to purge the free space. Heating was discontinued, the triisobutyl aluminum-iodine solution added and the bottle capped, before the vapors condensed, with a crown cap having a polyurethane rubber liner and a perforation for hypodermic injection of reactants. When the bottle was cooled at 25° C. there was a 19-inch vacuum inside the bottle.

The bottle was next charged through a hypodermic needle from a pressure tank of propylene until the back pressure rose to 27 p.s.i.a., the bottle being shaken to insure equilibrium with the benzene. The bottle was then similarly hypodermically charged with ethylene until the pressure rose a further 3 p.s.i.a. This charge is designed on the basis of reactivity ratios to yield an initial polymer containing 65% ethylene, 35% propylene on a mol basis.

The vanadium oxytrichloride solution was next injected and the bottle quickly put into a shaking cradle and connected through a flexible hose, a reducing valve (set for 25 p.s.i.g.) and a hypodermic needle to a pressure reservoir containing a previously prepared mixture of 65% ethylene, 35% propylene on a mol basis. At the end of 16 hours the bottle was disconnected and removed, the excess monomers vented and the bottle opened. The polymer solution was stirred into a bath of methanol containing alpha-naphthyl thiourea to precipitate the polymer, which was then dried in a vacuum oven. There were obtained 10.5 grams of a rubbery, transparent polymer.

C. *Vulcanization*

Parts
Ethylene-propylene copolymer (prepared as just described) _____ 100
HAF carbon black _____ 50
Dicumyl peroxide mixture (containing 40% by weight of dicumyl peroxide on an inert carrier) _ 10
Sulfur _____ 1

A stock was made up from the foregoing and specimens cured at 310° F. for 40 and 60 minutes. Following are the properties obtained.

TABLE VI

Tensile strength (p.s.i.), cured for:
  40 min. _____ 2200
  60 min. _____ 2100
300% Modulus (p.s.i.), cured for:
  40 min. _____ 475
  60 min. _____ 475
Ultimate elongation (percent), cured for:
  40 min. _____ 800
  60 min. _____ 600
Percent break set _____ 17

*Example V.—Use of alkali metal alkyl and VOCl₃-benzene complex*

A. *Preparation of aluminum alkyl-iodine solution*

Triisobutyl aluminum solution (1.0 molar, in benzene) _____ 25 ml. (0.025 mol).
Butyl lithium solution (1.5 molar, in heptane) _____ 1 ml. (0.0015 mol).
Iodine _____ 7.5 g. (0.059 gram-atom.)

The butyl lithium solution was stirred into the triisobutyl solution, followed by the iodine. A precipitate formed during the addition of the iodine, but redissolved by the time the addition was complete.

B. *Polymerization*

| | |
|---|---|
| Hexane | 500 ml. |
| Triisobutyl aluminum-iodine solution (prepared as just described) | 4 ml. |
| Vanadium oxytrichloride solution (0.1 molar, in benzene) | 10 ml. (0.001 mol). |
| Ethylene and propylene | By pressure. |

The hexane and triisobutyl aluminum-iodine solution were loaded into a 28-ounce beverage bottle, which was then sealed with a neoprene-lined crown cap having a perforation for hypodermic addition of reactants. Propylene was then charged through a hypodermic needle from a pressure tank of propylene, with shaking of contents to insure equilibrium, until the back pressure had risen 27 p.s.i above the starting pressure. Thereafter ethylene was similarly charged until the back pressure rose a further 3 p.s.i. The vanadium exytrichloride solution was then injected hypodermically and the bottle quickly placed in a shaking cradle. A reservoir pressure containing ethylene and propylene pre-mixed in 65/35 mol ratio was then connected to the bottle as in the preceding example. The reaction was run for 16 hours, at the end of which time the polymer was recovered as in the preceding example. There were obtained 19.5 grams of a transparent, snappy, rubbery polymerizate which banded well on the laboratory roll mill.

C. *Vulcanization*

| | Parts |
|---|---|
| Ethylene-propylene copolymer (prepared as just described) | 100 |
| HAF carbon black | 50 |
| Dicumyl peroxide mixture (40% dicumyl peroxide, 60% inert carrier | 10 |
| Sulfur | 1 |

Specimens of a stock from the above ingredients were cured at 310° F. for 20, 40 and 60 minutes. Following are the properties obtained.

TABLE VIII

| | |
|---|---|
| Tensile strength (p.s.i.), cured for: | |
| 20 min. | 3150 |
| 40 min. | 3150 |
| 60 min. | 3225 |
| 300% Modulus (p.s.i.), cured for: | |
| 20 min. | 800 |
| 40 min. | 1275 |
| 60 min. | 1350 |
| Elongation (percent), cured for: | |
| 20 min. | 630 |
| 40 min. | 550 |
| 60 min. | 520 |
| Break set (percent) | 11 |

*Example VI*

A. *Preparation of aluminum-alkyl-iodine solution*

| | |
|---|---|
| Triisobutyl aluminum solution (1.0 molar, in benzene) | 25 ml. (0.025 mol). |
| Butyl lithium solution (1.5 molar, in heptane) | 1 ml. (0.0015 mol). |
| Iodine | 3.0–7.5 g. (per Table IX (.023 – 0.059 gram-atom) |

B. *Polymerization*

| | Ml. |
|---|---|
| Hexane | 500 |
| Triisobutyl aluminum-iodine solution (prepared as described at A) | 2 or 4 |
| Vanadium oxytrichloride solution (0.1 molar, in benzene) | 10 |
| Ethylene and propylene | By pressure. |

A series of runs was made in accordance with the above recipe and the procedure of Example V, varying the iodine in the triisobutyl solution and the amount of that solution used, as set forth herewith in Table IX. Vulcanizates were also made in accordance with the formulation in Example V. The uncured copolymers were all transparent, snappy, rubbery materials.

TABLE IX

| Run No. | 1 | 2 | 3 | 4 | 5 |
|---|---|---|---|---|---|
| Grams of iodine added to Al(i-Bu)₃ solution | 7.5 | 3.0 | 3.0 | 10.0 | 10.0 |
| Ml. of Al(i-Bu)₃ solution used in polymerization | 2 | 2 | 4 | 2 | 4 |
| Yield of copolymer obtained (grams) | 18.3 | 34.2 | 34.9 | 2.9 | 1.2 |
| Properties of vulcanizates, cured 310° F.: | | | | | |
| Tensile strength, cured for— | | | | | |
| 20 min | 3,000 | 2,600 | | | |
| 40 min | 3,050 | 2,600 | | | |
| 60 min | 3,000 | 2,675 | | | |
| 300% modulus, cured for— | | | | | |
| 20 min | 600 | 800 | | | |
| 40 min | 900 | 1,100 | | | |
| 60 min | 975 | 1,125 | | | |
| Elongation (percent), cured for— | | | | | |
| 20 min | 760 | 660 | | | |
| 40 min | 660 | 560 | | | |
| 60 min | 610 | 560 | | | |
| Break set (percent) | 11 | 21 | | | |

*Example VII.—Variation of monomer ratio*

| | |
|---|---|
| Hexane | 500 ml. |
| Aluminum trihexyl-iodine solution 1.0 molar in each of AlHex₃ and I₂, in hexane) | 3 ml. |
| Vanadium oxytrichloride solution (0.1 molar, in hexane) | 5 ml. |
| Ethylene and Propylene | Varied by pressure (per Table X). |

A series of runs was made in accordance with the above recipe, varying the ratio of charge of ethylene and propylene from run to run as set forth in Table X. In each case the hexane and aluminum trihexyl solution were charged into 28-ounce beverage bottle which was then flushed with argon and sealed with a perforated crown cap lined with neoprene. Thereafter the bottle was charged with propylene and with ethylene through hydrodermic needles from pressure tanks, with shaking to insure equilibrium, the increase in back pressure due to the injection of each of these monomers being recorded for that run in Table X. Finally the bottle was placed in a shaking machine and connected through a flexible hose and hypodermic needle to a manifold in which a mixture of ethylene and propylene in 60/40 mol ratio was maintained at a pressure of 30 p.s.i.g. The reaction was continued for 16 hours, at the end of which time the excess monomers were vented, the bottles operated, and the polymer recovered by precipitation with methanol containing 1% alpha-naphthyl thiourea, and drying in a vacuum oven. Set forth herewith are particulars of the several runs.

TABLE X

| Increase in back pressure (p.s.i.) upon injection of— | | Yield of copolymer (grams) | Run No. |
|---|---|---|---|
| Propylene | Ethylene | | |
| 27 | 3 | 35.9 | 1 |
| 20 | 10 | 32.4 | 2 |
| 10 | 20 | 30.0 | 3 |

All of these copolymers were clear, rubbery and had good snap. All banded well on the mill, the product of Run No. 1 being best in this respect.

From the foregoing general discussion and detailed experimental examples and data, it will be evident that this invention makes possible the production of olefin copolymers substantially free of block copolymer and other crystalline structures. This topography of the copolymers is reflected in their superior rubbery properties, both in the unvulcanized and vulcanized states.

What is claimed is:

1. Process of producing a highly rubbery copolymer, free from block copolymer and crystalline structure, of a plurality of alpha-monoolefins containing 2–6 carbon atoms and up to 10 mol percent of a double-bond-introducing monomer selected from the group consisting of acetylene and the conjugated diolefins, said copolymer containing not more than 85 mol percent of any single monoolefin, said process comprising contacting the materials to be copolymerized with a catalyst comprising (A) the reaction product of (I) an aluminum compound of the formula (1) 

wherein, independently in each occurrence, R is a hydrocarbon group containing from 1 to 12 carbon atoms and R' is a radical selected from the group consisting of hydrocarbon groups containing from 1 to 12 carbon atoms and hydrogen, with (II) iodine, with the proviso that where any of the R and R' substituents contain less than 5 carbon atoms the aluminum compound must first be mixed with an alkyl lithium compound in which the alkyl group contains 1–10 carbon atoms, plus (B) vanadium oxytrichloride, said vanadium oxytrichloride having been in contact, at a time not later than its initial contact with the aluminum compound (I) with benzene, the ratio of gram-atoms of aluminum in said reaction product (A) to the number of gram-atoms of vanadium in said vanadium oxytrichloride (B) being from 1:1 to 20:1 and the ratio of the number of gram-atoms of iodine (II) per mol of aluminum compound (I) being from 0.5:1 to 4.0:1.

2. Process of producing a highly rubbery copolymer, free from block copolymer and crystalline structure, of a plurality of alpha-monoolefins containing 2–6 carbon atoms and up to 10 mol percent of a double-bond-introducing monomer selected from the group consisting of acetylene and the conjugated diolefins, said copolymer containing not more than 85 mol percent of any single monoolefin, said process comprising contacting the materials to be copolymerized with a catalyst comprising (A) the reaction product of (I) trihexyl aluminum with (II) iodine, plus (B) vanadium oxytrichloride, said vanadium oxytrichloride having been in contact, at a time not later than its initial contact with the trihexyl aluminum, with benzene, the ratio of gram-atoms of aluminum in said reaction product (A) to the gram-atoms of vanadium in the vanadium oxytrichloride (B) being 1:1 to 20:1 and the ratio of the gram-atoms of iodine (II) to the mol of trihexyl aluminum (I) being 0.5:1 to 4.0:1.

3. Process of producing a highly rubbery copolymer, free from block copolymer and crylstalline structure, of a plurality of alpha-monoolefins containing 2–6 carbon atoms and up to 10 mol percent of a double-bonded introducing monomer selected from the group consisting of acetylene and the conjugated diolefins, said copolymer containing not more than 85 mol percent of any single monoolefin, said process comprising contacting the materials to be copolymerized with a catalyst comprising (A) the reaction product in benzene solution, of (I) trihexyl aluminum with (II) iodine, plus (B) vanadium oxytrichloride, the ratio of gram-atoms of aluminum in said reaction product (A) to the mols of vanadium in said vanadium oxytrichloride (B) being 1:1 to 20:1 and the ratio of gram-atoms of iodine (II) to the mols of trihexyl aluminum (I) being 0.5:1 to 4.0:1.

4. Process of producing a highly rubbery copolymer, free from block copolymer and crystalline structure, of 50 to 85 mol percent of ethylene and 15 to 50 mol percent of propylene, said process comprising contacting the materials to be copolymerized with a catalyst comprising (A) the reaction product of (I) an aluminum compound of the formula (1) 

wherein R, independently in each occurrence, is a hydrocarbon group containing from 1 to 12 carbon atoms and R' is a radical selected from the group consisting of hydrocarbon groups containing from 1 to 12 carbon atoms and hydrogen with (II) iodine, with the proviso that where any of the R and R' substituents contain less than 5 carbon atoms the aluminum compound (I) must first be mixed with an alkyl lithium compound in which the alkyl group contains 1–10 carbon atoms, plus (B) vanadium oxytrichloride, said vanadium oxytrichloride having been in contact, at a time not later than its initial contact with the aluminum compound (I), with benzene, the ratio of gram-atoms of aluminum in said reaction product (A) to gram-atoms of vanadium in said vanadium oxytrihalide (B) being 1:1 to 20:1 and the ratio of gram-atoms of iodine (II) to mols of the aluminum compound (I) being 0.5:1 to 4.0:1.

5. Process of producing a highly rubbery copolymer, free from block copolymer and crystalline structure, of 50 to 85 mol percent of ethylene and 15 to 50 mol percent of propylene, said process comprising contacting the materials to be copolymerized with a catalyst comprising (A) the reaction product of (I) trihexyl aluminum with (II) iodine, plus (B) vanadium oxytrichloride, said vanadium oxytrichloride having been in contact, at a time not later than its initial contact with the aluminum compound, with benzene, the ratio of gram-atoms of aluminum in said reaction product (A) to the gram-atoms of vanadium in said vanadium oxytrichloride (B) being 1:1 to 20:1 and the ratio of gram-atoms of iodine (II) to mols of trihexyl aluminum (I) being 0.5:1 to 4.0:1.

6. Process of producing a highly rubbery copolymer, free from block copolymer and crystalline structure, of a plurality of alpha-monoolefins containing 2–6 carbon atoms and up to 10 mol percent of a double-bond-introducing monomer selected from the group consisting of acetylene and the conjugated diolefins, said copolymer containing not more than 85 mol percent of any single monoolefin, said process comprising contacting the materials to be copolymerized with a catalyst comprising (A) the reaction product of (I) a mixture of triisopropyl aluminum with an alkyl lithium compound in which the alkyl group contains 1–10 carbon atoms with (II) iodine, plus (B) vanadium oxytrichloride, said vanadium oxytrichloride having been in contact, at a time not later than its initial contact with the triisopropyl aluminum, with benzene, the ratio of gram-atoms of aluminum in said reaction product (A) to the number of gram-atoms of vanadium in said vanadium oxytrichloride (B) being from 1:1 to 20:1 and the ratio of the number of gram-atoms of iodine (II) per mol of triisopropyl aluminum being from 0.5:1 to 4.0:1.

7. Process of producing a highly rubbery copolymer, free from block copolymer and crystalline structure, of a plurality of alpha-monoolefins containing 2–6 carbon atoms and up to 10 mol percent of a double-bond-introducing monomer selected from the group consisting of acetylene and the conjugated diolefins, said copolymer containing not more than 85 mol percent of any single monoolefin, said process comprising contacting the materials to be copolymerized with a catalyst comprising (A) the reaction product of (I) trihexyl aluminum with (II) iodine, plus (B) vanadium oxytrichloride, said vanadium oxytrichloride having been dissolved in benzene prior to its contact with the trihexyl aluminum, the ratio of gram-atoms of aluminum in said reaction product (A) to gram-atoms of vanadium in said vanadium oxytrichloride (B) being 1:1 to 20:1 and the ratio of gram-atoms of iodine (II) to mols of trihexyl aluminum (I) being 0.5:1 to 4.0:1.

8. Process of producing a highly rubbery copolymer, free from block copolymer and crystalline structure, of a plurality of alpha-monoolefins containing 2–6 carbon atoms and up to 10 mol percent of a double-bond-introducing monomer selected from the group consisting of acetylene and the conjugated diolefins, said copolymer containing not more than 85 mol percent of any single monoolefin, said process comprising contacting the materials to be copolymerized with a catalyst comprising (A) the reaction product in solution in an aliphatic hydrocarbon solvent of (I) trihexyl aluminum with (II) iodine, plus (B) vanadium oxytrichloride, said vanadium oxytrichloride having been dissolved in benzene prior to its contact with the trihexyl aluminum, the ratio of gram-atoms of aluminum in said reaction product (A) to gram-atoms of vanadium in said vanadium oxytrichloride (B) being 1:1 to 20:1 and the ratio of gram-atoms of iodine (II) to mols of trihexyl aluminum (I) being 0.5:1 to 4.0:1.

References Cited by the Examiner

UNITED STATES PATENTS

| | | | |
|---|---|---|---|
| 2,898,327 | 8/59 | Gilbert et al. | 260—88.2 |
| 2,940,963 | 6/60 | Denkowski | 260—94.9 |
| 2,959,576 | 11/60 | Payne | 260—94.9 |
| 2,962,451 | 11/60 | Schreyer | 260—93.7 |
| 3,017,401 | 1/62 | Bo et al. | 260—94.9 |

FOREIGN PATENTS

| | | |
|---|---|---|
| 223,593 | 8/59 | Australia. |
| 554,803 | 1/57 | Italy. |
| 583,040 | 1/60 | Belgium. |
| 1,162,882 | 4/58 | France. |

OTHER REFERENCES

"Petroleum Refiner," Sittig, March 1960, vol. 40, No. 3, pages 129–136.

"Angew. Chem.," vol. 73, 1961, pages 186–197; pages 191 pertinent.

"Organometallic Chemistry," by Zeiss, 1960, Reinhold Pub. Co., New York, page 238, pertinent.

JOSEPH L. SCHOFER, *Primary Examiner.*

MORRIS LIEBMAN, LEWIS GOTTS, *Examiners.*